US006754506B2

(12) United States Patent
Chang et al.

(10) Patent No.: US 6,754,506 B2
(45) Date of Patent: Jun. 22, 2004

(54) TDMA COMMUNICATION SYSTEM HAVING ENHANCED POWER CONTROL

(75) Inventors: Li Fung Chang, Holmdel, NJ (US); Kapil K. Chawla, Scotch Plains, NJ (US); Justin Chi-I Chuang, Holmdel, NJ (US); Zoran Kostic, Holmdel, NJ (US); Xiaoxin Qiu, Bridgewater, NJ (US); Nelson Ray Sollenberger, Farmingdale, NJ (US); Shailender B. Timiri, Bellevue, WA (US)

(73) Assignee: AT&T Wireless Services, Inc., Redmond, WA (US)

( * ) Notice: Subject to any disclaimer, the term of this patent is extended or adjusted under 35 U.S.C. 154(b) by 519 days.

(21) Appl. No.: 09/784,901

(22) Filed: Feb. 16, 2001

(65) Prior Publication Data

US 2003/0207695 A1 Nov. 6, 2003

Related U.S. Application Data

(60) Provisional application No. 60/211,163, filed on Jun. 13, 2000.

(51) Int. Cl.[7] .................................................. H04Q 7/20
(52) U.S. Cl. ....................... 455/522; 455/69; 455/245.1
(58) Field of Search ............................... 455/67.1, 522, 455/245.1, 69, 67.11, 67.16, 247.1

(56) References Cited

U.S. PATENT DOCUMENTS

| | | | |
|---|---|---|---|
| 5,333,175 A | | 7/1994 | Ariyavisitakul et al. |
| 5,396,516 A | | 3/1995 | Padovani et al. |
| 5,410,343 A | | 4/1995 | Coddington et al. |
| 5,428,608 A | | 6/1995 | Freeman et al. |
| 5,564,074 A | * | 10/1996 | Juntti ....................... 455/67.11 |
| 5,745,520 A | | 4/1998 | Love et al. |
| 5,774,785 A | | 6/1998 | Karlsson |
| 5,790,939 A | * | 8/1998 | Malcolm et al. ............ 455/13.2 |
| 5,794,129 A | | 8/1998 | Komatsu |
| 5,839,056 A | | 11/1998 | Hakkinen |
| 5,940,430 A | | 8/1999 | Love et al. |
| 5,949,754 A | * | 9/1999 | Takahashi .................... 370/222 |
| 5,991,284 A | | 11/1999 | Willenegger et al. |
| 5,999,832 A | | 12/1999 | Vannatta et al. |
| 6,035,209 A | | 3/2000 | Tiedemann, Jr. et al. |
| 6,072,792 A | | 6/2000 | Mazur et al. |
| 6,073,025 A | * | 6/2000 | Chheda et al. ............... 455/522 |
| 6,137,840 A | * | 10/2000 | Tiedemann et al. .......... 375/297 |
| 6,138,020 A | * | 10/2000 | Galyas et al. ................ 455/436 |
| 6,154,659 A | * | 11/2000 | Jalali et al. .................. 455/522 |
| 6,385,437 B1 | * | 5/2002 | Park et al. ..................... 455/69 |
| 6,397,043 B1 | * | 5/2002 | Kang ........................... 455/69 |
| 6,490,461 B1 | * | 12/2002 | Muller ........................ 455/522 |
| 6,587,442 B1 | * | 7/2003 | Tripathi ....................... 370/311 |

FOREIGN PATENT DOCUMENTS

EP     0 853 393 A1     7/1998

OTHER PUBLICATIONS

M. Almgren et al., "Power Control in a Cellular System," IEEE VTC '94, 1994, pp. 833–837, IEEE, New York.
Dev Gupta & Idris T. Vasi "Perspectives on Residential Broadband", Integrated Network Corp., Jul. 12, 1995, pp. 693–700.
ISDN: "Give up and Go?", 4465 BYTE 21 (1996) Feb., No. 2, Peterborough, NH, US, pp. 75–80.
Fernseh–Und Kino–Technik "Interaktives Multimedia MIT Mediaservern", Dec., 1997, pp. 849–853.

\* cited by examiner

Primary Examiner—Nay Maung
Assistant Examiner—Tan Trinh

(57) ABSTRACT

A TDMA wireless communication system adjusts the power control target and transmission power based upon link quality to enhance voice capacity. The power can be adjusted in response to the average SNIR and number of decoding errors in a link quality reporting period. The power control target can be increased and decreased in discrete intervals after evaluating the number of decoding errors in the reporting period. The transmission power can be adjusted towards the new power control target based upon the average SNIR.

14 Claims, 4 Drawing Sheets

100

TDMA COMMUNICATION SYSTEM HAVING ENHANCED POWER CONTROL

CROSS REFERENCE TO RELATED APPLICATIONS

This application claims priority under 35 U.S.C. § 119(e) of U.S. Provisional Patent Application No. 60/211,163, filed on Jun. 13, 2000, which is incorporated herein by reference.

STATEMENT REGARDING FEDERALLY SPONSORED RESEARCH

Not Applicable.

FIELD OF THE INVENTION

The present invention relates generally to telecommunication systems and, more particularly, to wireless communication systems.

BACKGROUND OF THE INVENTION

Wireless communication systems can send and receive data in a variety of ways. One type of wireless system utilizes time division multiple access (TDMA) techniques to provide communication channels for users of the network. As is well known to one of ordinary skill in the art, TDMA system data channels use the same set of carrier frequencies in different time slots so as to be orthogonal in the time domain. TDMA techniques allow multiple users to share the same frequency band by multiplexing transmissions in non-overlapping time slots. The total spectrum can be divided into frequency channels, each of which can be divided in time.

Known TDMA systems generally do not have a power control algorithm that can respond to rapid interference changes. In current TDMA systems, frequency reuse distance is implemented to ensure service (mainly voice) quality so that the capacity of such systems is usually not limited by interference.

With the recent development of so-called third generation (3G) wireless systems e.g. Enhanced General Packet Radio Services (EGPRS), tight frequency reuse, e.g. reuse frequency in every cell and every sector, has become increasingly important to improve the spectrum efficiency. In such systems, co-channel interference becomes the limiting factor of the system capacity and the service quality.

It would, therefore, be desirable to provide a wireless TDMA system having a power control scheme that responds to rapid interference variations. It would further be desirable to provide a TDAM system having a power control system that minimizes co-channel interference.

SUMMARY OF THE INVENTION

The present invention provides a TDMA system having first and second power control mechanisms. The first power control mechanism adjusts the power control target based upon a count of decoding errors during a decoding error-reporting period. The second power control mechanism adjusts the transmission power based upon a link quality measure for the previous link quality measurement period. This arrangement allows the TDMA system to respond effectively to rapidly changing interference conditions.

In one aspect of the invention, a wireless TDMA system receives a frame error indicator value from a receiver, e.g., mobile station, for the previous reporting period, which can correspond to a predetermined number of frames. In one embodiment, the receiver sets the frame error indicator to a first value when a predetermined threshold for the number of decoding errors is exceeded and a second value if the predetermined threshold is not exceeded. The receiver sends the frame error indicator value to the transmitter, which adjusts the power control target up or down for the next period based upon the value of the frame error indicator.

The transmitter also periodically receives a link quality measure from the receiver. In one embodiment, the receiver sends an average SINR level for a corresponding reporting period, which can be the same or different from the decoding error-reporting period. If the received SINR level is above a current target SINR level, the transmission power level is decreased for the next period. If the SINR level is below the current target SINR level, the transmission power level is increased for the next period.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
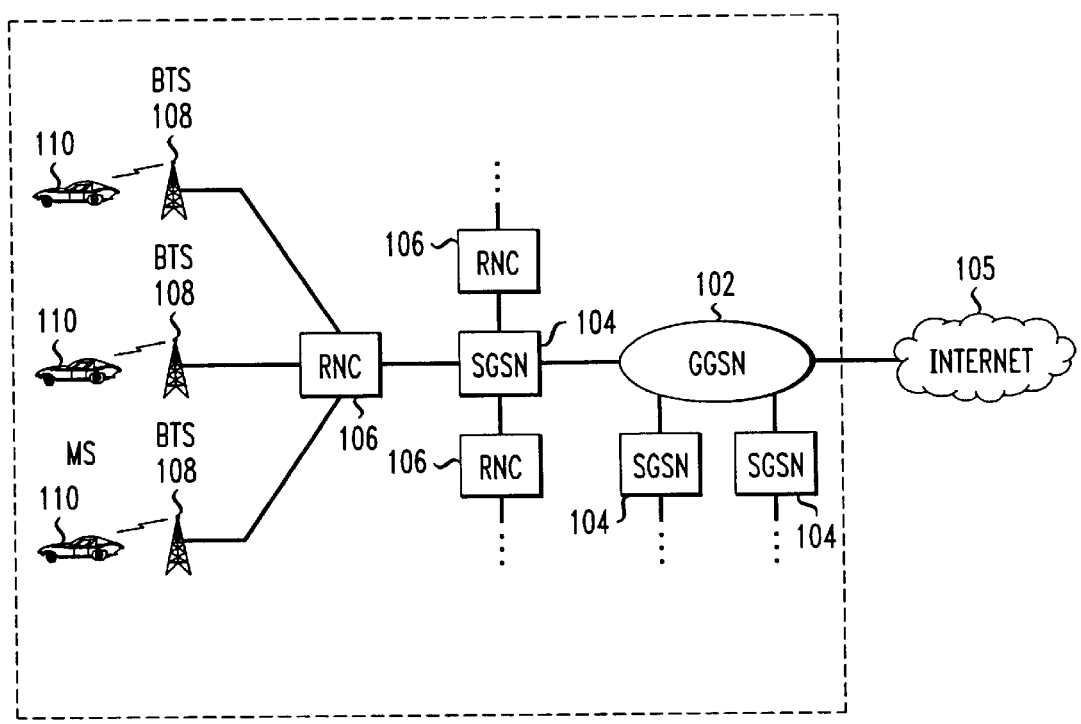
FIG. 1 is a schematic representation of a communication network having power control in accordance with the present invention.

FIG. 1 shows an exemplary wireless time division multiple access (TDMA) system 100 having power control in accordance with the present invention. The TDMA system has an enhanced general packet radio service (EGPRS) architecture. More particularly, the EGPRS system 100 includes a Gateway GPRS service node (GGSN) 102 coupled to a plurality of supporting GPRS service nodes (SGSN) 104. The GGSN 102 can be coupled to the Internet 105 or to other networks. The SGSN 104 is connected to a plurality of radio network controllers (RNCs) 106, each of which communicates with a plurality of base station transceivers (BTS) 108. Each BTS 108 communicates with mobile stations (MS) 110 located within corresponding cells or sectors. EGPRS type networks are well known to one of ordinary skill in the art.

In an exemplary embodiment, the TDMA EGPRS system 100 includes random frequency hopping. In general, TDMA systems include a plurality of time slots in which data is transmitted by the BTS. Each user is assigned to a respective time slot within TDMA frames. In systems having random frequency hopping (RFH), a random frequency-hopping pattern is assigned to each transmitter. A random frequency-hopping pattern specifies a sequence of transmit frequencies that a transmitter should follow on a frame-by-frame basis.

In this system, interference is uncorrelated from one data frame to the next data frame due to the unknown hopping patterns of co-channel interferers. Representing the link quality with an average value can provide an unacceptable service quality level since large channel variations can occur. For a user experiencing small channel variations, the power control target can be set close to the required average link quality level for a given performance requirement. For a user encountering rapid channel variations, the power control target can be set higher than the nominal value to achieve the same required performance. Thus, the power control target is not a constant value but rather is determined based upon the service type, service requirement, channel condition, terminal battery condition, and the like.

The link service quality can be determined by the mean and variation of the channel quality measurements, such as signal-to-noise-plus-interference (SINR) levels. In contrast to known TDMA systems, the present invention adapts the power control target to track both mean and variation of signal quality measurements and adjusts the power in response thereto.

Figure 2:
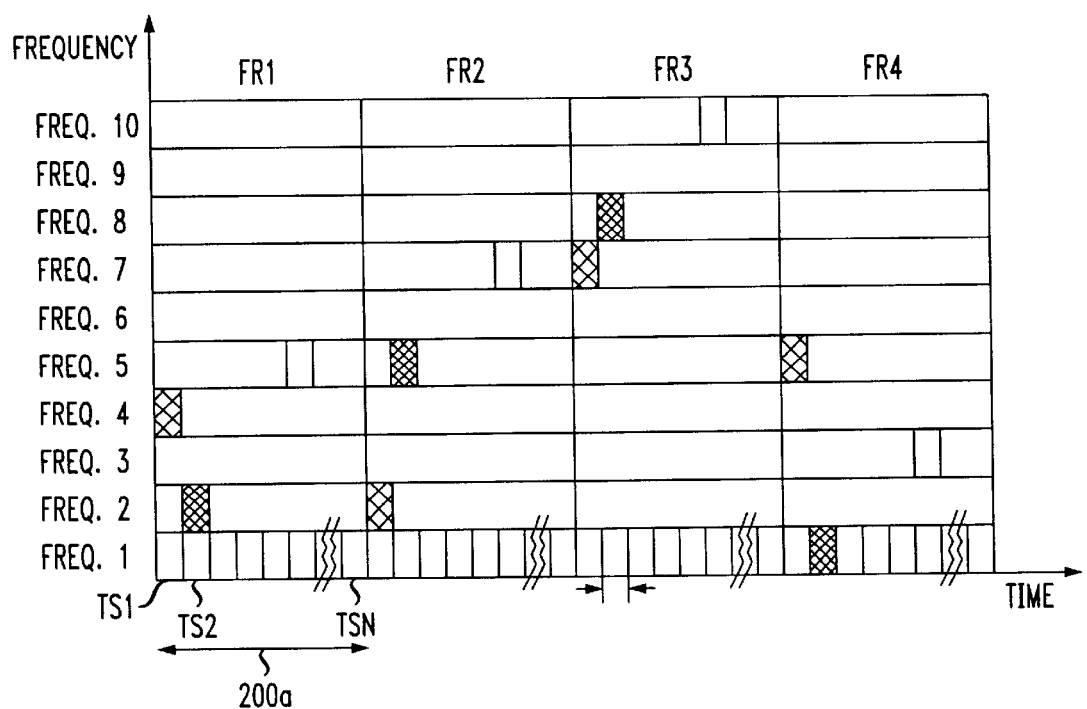
FIG. 2 is a graphical representation of an exemplary frequency-hopping scheme that can be used by the system of FIG. 1.

FIG. 2 shows an exemplary RFH scheme for a system having power control in accordance with the present invention. Each TDMA frame 200 has a plurality of time slots TS1–N each of which can be associated with a particular user. For example, the first time slot TS1 in each frame corresponds to a first user, the second time slot TS2 corresponds to a second user, and the sixth time slot TS6 corresponds to a third user, etc. Each user is assigned a specific frequency-hopping pattern that includes a plurality of frequencies Freq1–10. It is understood that the number of time slots and number of frequencies are illustrative to facilitate an understanding of the invention.

In the exemplary embodiment shown in FIG. 2, the random frequency-hopping pattern of the first user assigned to the first time slot TS1 corresponds to the fourth frequency Freq4 in the first frame FR1, the second frequency Freq2 in the second frame FR2, the seventh frequency Freq7 in the third frame FR3 and the fifth frequency Freq5 in the fourth frame FR4. Similarly, the second and third users, occupying the second and sixth time slots TS2, TS6, respectively, are assigned to respective random frequency-hopping patterns that include frequencies for each frame as shown.

It is understood that the above configuration is exemplary and that one of ordinary skill in the art can readily vary one or more of the parameters, including number of time slots, number of frequencies, and hopping patterns, to meet the needs of a particular application.

In general, power control in accordance with the present invention includes a first or outer loop that adapts the power control target for each user and a second or inner loop that adjusts the transmission power towards a specified target. As known to one of ordinary skill in the art, the power control target (e.g., SINR in dBs) corresponds to a desired error rate. For example, the power control target can be chosen to achieve a one percent frame error rate (FER). The outer loop power control adjustment is triggered by error events so as to allow a transmitter to rapidly react to interference detected by the receiver. It will be appreciated that users having the same average Signal-to-Interference-plus-Noise Ratio (SINR), for example, can have different levels of instantaneous interference and interference variations. The inner loop adjusts the transmission power based upon average SINR levels.

Figure 3:
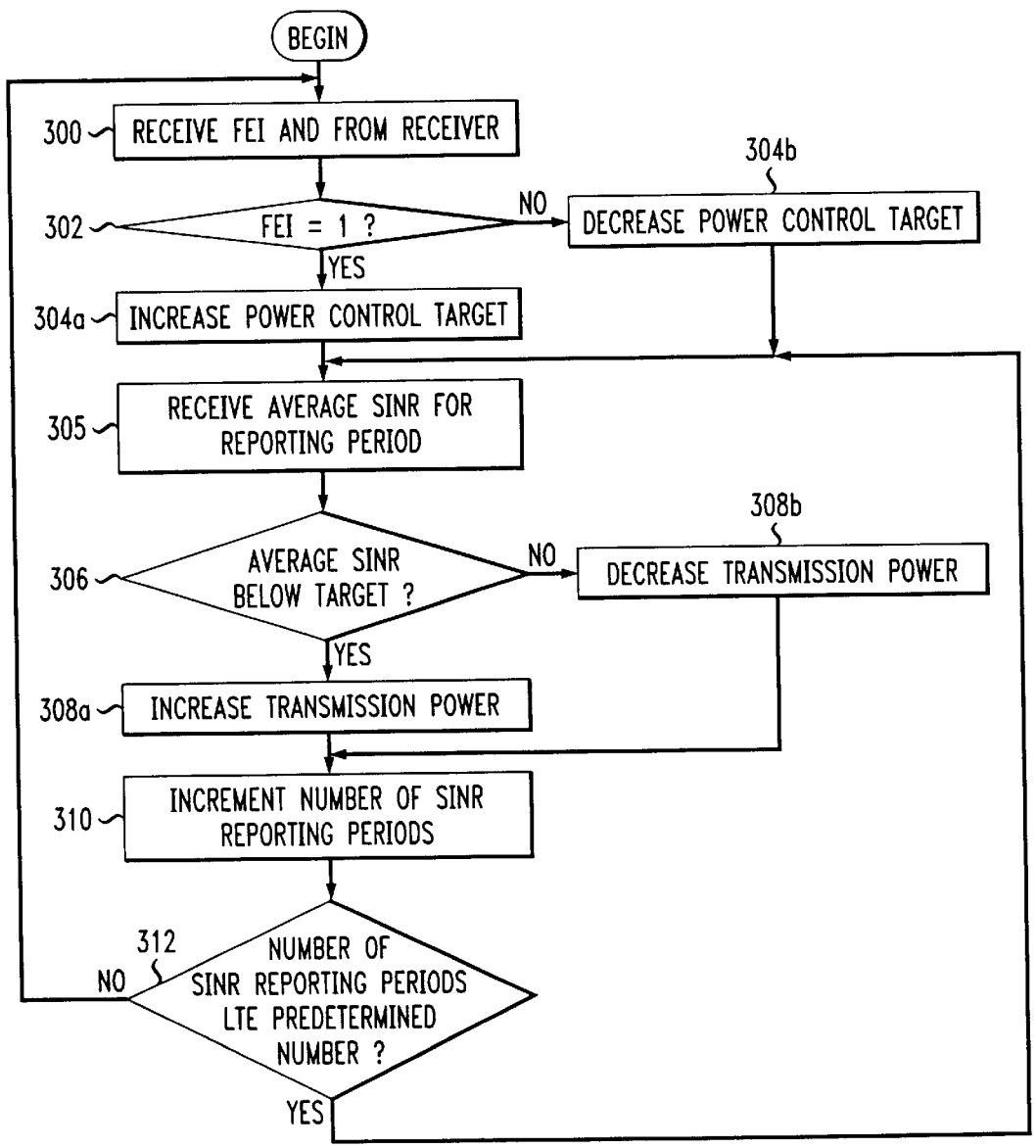
FIG. 3 is a flow diagram showing an exemplary sequence of steps for providing a power control scheme in accordance with the present invention.

FIG. 3 shows an exemplary sequence of steps for implementing power control for a TDMA wireless communication system, such as an EGPRS system with random frequency hopping, in accordance with the present invention. The power control target and the transmission power are adjusted to enhance the data transfer capacity and frequency spectrum efficiency. This arrangement provides a quality driven power control technique that minimizes the effects of rapid interference variations and slow power adjustments.

Initially, a nominal power control target is selected based upon a desired service quality level. For example, for a voice frame error rate (FER) of about one percent, an initial power control target of about 13 dB can be selected as the starting value for each user.

In step 300, a receiver sends a frame error indicator (FEI) value to the transmitter indicating whether the number of receiver decoding errors for the previous reporting period is greater than a predetermined threshold. In one embodiment, for one or more detected errors the FEI for the reporting period is set to one by the receiver. It is understood that the reporting period can be based upon a variety of intervals, such as frame count, time slot count, and the like. In one particular embodiment, the decoding error reporting period is twenty-four frames.

In step 302, the transmitter determines whether the received FEI value equals one, i.e., the number of decoding errors detected by the receiver in the previous reporting period was greater than the predetermined threshold. If the FEI value equals one, the power control target is increased by a predetermined step size in step 304a. If the FEI value does not equal one, e.g., is zero, in step 304b the power control target for the next reporting period, e.g., twenty-four frames, is decreased by a predetermined step size.

In step 305, the transmitter receives a link quality measure for the previous reporting period. In one particular embodiment, the link quality measure is an average SINR level for the previous link quality reporting period, e.g., six frames. In step 306, it is determined whether the received average SINR level for the previous reporting period is below the current power control target, e.g., SINR target level. If the average SINR is above the current power control target, in step 308a the transmission power is increased by a predetermined amount for the next period. If the average SINR is above the power control target, in step 308b the transmission power is decreased.

In step 310, a count of the number of link quality reporting periods is incremented and in step 312, the count is evaluated to determine whether the transmission power adjustment (inner) loop is complete such that the power control target adjustment (outer) loop should be re-entered at step 300.

It is understood that a wide variety of link quality measures can be used. Exemplary link quality measurements include average and standard deviation of Signal-to-Interference-plus-Noise Ratio (SINR), average and standard deviation of Bit Error Rate (BER), and average and standard deviation of Block Error Rate (BLER). It is further understood that the respective reporting periods for the inner and outer loops can be based on the same or different bases. In addition, while the same basis can be used, e.g., frames, the number of frames for the inner and outer loop reporting periods can be the same or different. In one embodiment, the transmission power is adjusted every six frames and the power control target is adjusted every twenty-four frames.

In one particular embodiment, the transmitter determines whether the FEI value is set to one and if so, increases the power control target by an up step size $\delta_{up}$ (in dB). In an exemplary embodiment, the power control target can be increased up to a maximum level $\Gamma_{max}$. If the FEI value is set to zero, the transmitter decreases the power control target by a down step amount $\delta_{dn}$.

As described above, the transmitter adjusts the transmission power towards the adjusted power control target based upon the received average SNIR. In an exemplary embodiment, the transmission power is adjusted in accordance with Equation (1) below:

$$P(n+1)=P(n)+\beta(\Gamma(n+1)-\bar{\gamma}(n))  \quad \text{(Eq. 1)}$$

where P(n) is the transmission power of the nth link quality reporting period, Γ(n+1) is the power control target in the (n+1) link quality reporting period, $\bar{\gamma}(n)$ is the average SINR in the nth link quality reporting period, and β is a damping factor.

In one embodiment, the respective step sizes $\delta_{up}$, $\delta_{dn}$ are determined in terms of an required average decoding error probability $p_f$ within a reporting period f. When the system reaches a stable condition, the step sizes can be determined from the average decoding error probability for the reporting period as shown in Equation 2 below:

$$p_f = \frac{\delta_{dn}}{\delta_{up}} \quad \text{Eq. (2)}$$

The step sizes can be further defined in terms of the target voice error frame rate $p_0$ as set forth in Equation 3 below:

$$\frac{\delta_{dn}}{\delta_{up}} = 1 - (1-p_0)^L \approx Lp_0 \quad \text{Eq. (3)}$$

where L is the length of the reporting period in number of radio blocks. After fixing one of the step sizes, the up step size $\delta_{up}$ for example, the down step size can be as shown below in Equation 4:

$$\delta_{dn}=Lp_0\delta_{up} \quad \text{Eq. (4)}$$

For relatively low, e.g. <10%, target frame error rate $p_0$, the approximation is relatively accurate. The step sizes can be adjusted based upon a variety of factors including signaling latency, error statistics, desired convergence speed and the like.

Figure 4:
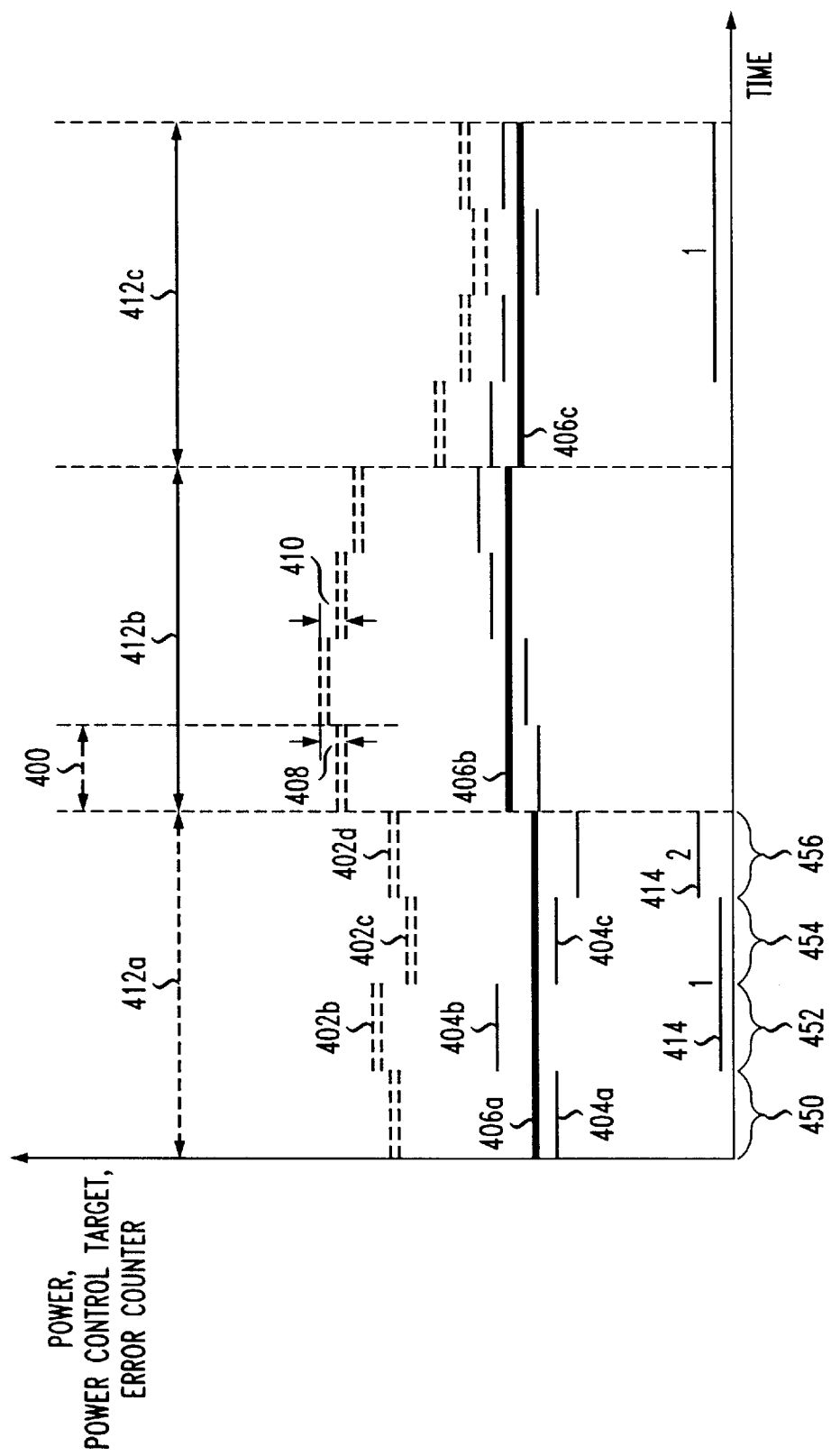
FIG. 4 is a graphical depiction of power, power control target, and error count over time for a power control scheme in accordance with the present invention.

FIG. 4 pictorially shows operation of the inner and outer power control loops described above to adjust the transmission power and power control target. After each link quality reporting period 400, which can correspond to six frames, the signal transmission power level 402 is adjusted. In one embodiment, the link quality is evaluated based upon an average SINR level 404 for the reporting period sent from a receiver. If the SINR level 404 for the reporting period 400 is below a SINR target level 406, the transmission power 402 is adjusted upwards by a predetermined step size 408. If the SINR level 404 is above the SINR target 406, then the transmission power is adjusted downwards by a predetermined step size 410.

For example, in the initial SINR reporting period 450, the received SINR level 404a is below the SINR target 406a so that the transmission power level 402b is increased for the second reporting period 452. For the second reporting period 452, the received SINR 404b is above the target 406a, so the transmission power 402c is decreased for the next period 454. The received SINR level 404c for that period 454 is below target 406a so that the transmission power 402d for the next period 456 is increased.

The power control target 406 is adjusted at predetermined intervals 412 based upon whether decoding errors are detected in the previous period. The predetermined intervals 412 can be based upon the same or different reporting periods as that used for transmission power adjustment. In one particular embodiment, the power control target is adjusted every twenty-four frames and the transmission power is adjusted every six frames. In addition, the link quality measurement for power control target control can be different from the measurement used for transmission power adjustment.

In the exemplary embodiment shown in FIG. 4, the power control target 406 is adjusted every four transmission power reporting periods 400, e.g., twenty-four frames, based upon the number of decoding errors 414, if any, that have occurred in the previous period. If the number of decoding errors is greater than a predetermined threshold, then the power control target 406 is increased for the next period. Otherwise, the power control target is decreased for next period.

For example, in the first decoding error reporting period 412a, two errors 414 are detected such that the frame error indicator (FEI) is set to one. More particularly, a count of two errors is greater than or equal to a predetermined threshold of one. Since the FEI is set to one, the power control target 406b is increased for the next period 412b. Since no decoding errors occur in the second period 412b, the FEI is zero and the power control target 406c is decreased for the third period 412c.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method for controlling power in a wireless TDMA system, comprising:

receiving a decoding error signal from a receiver indicative of a number of data decoding errors detected by a receiver for a decoding error reporting period;

receiving a link quality measurement value from the receiver for a link quality reporting period;

increasing a power control target by an up step interval or decreasing the power control target by a down step interval based upon the decoding error signal; and adjusting a signal transmission power based upon the link quality measurement, wherein the up and down step interval sizes correspond to an average decoding error probability.

2. The method according to claim 1, wherein the decoding error signal includes a frame error indicator that is set to a predetermined value if the number of data decoding errors in a given decoding error reporting period is greater than a predetermined threshold.

3. The method according to claim 1, wherein the decoding error reporting period corresponds to a predetermined number of frames.

4. The method according to claim 1, wherein the link quality measurement is selected from the group consisting of SINR, BER, and BLER.

5. The method according to claim 1, wherein the link quality measurement includes an average SINR value.

6. The method according to claim 1, further including increasing the signal transmission power if the link quality measurement is less than a predetermined target level.

7. The method according to claim 6, further including decreasing the signal transmission power if the link quality measurement level is greater than a predetermined target level.

8. The method according to claim 1, wherein the link quality reporting period corresponds to a predetermined number of frames.

9. A method for controlling power in a wireless TDMA system, comprising:

receiving a decoding error signal from a receiver indicative of a number of data decoding errors detected by a receiver for a decoding error reporting period;

receiving a link quality measurement value from the receiver for a link quality reporting period;

increasing a power control target by an up step interval or decreasing the power control target by a down step interval based upon the decoding error signal; and adjusting a signal transmission power according to $P(n+1)=P(n)+\beta(\Gamma(n+1)-\bar{\gamma}(n))$, where, $P(n)$ is the transmission power of the nth link quality reporting period, $\Gamma(n+1)$ is the power control target in the (1+1) link quality reporting period, $\bar{\gamma}(n)$ is the average SNR in the nth link quality reporting period, and $\beta$ is a damping factor.

10. A method for controlling power in an EGPRS system, comprising:

providing a first loop for adjusting a signal transmission power based upon a link quality measure received from a receiver for each link quality reporting period; and providing a second loop for adjusting a power control target based upon a decoding error signal received from the receiver for each decoding error reporting period, further including adjusting the power control target by respective up and down step sizes, wherein the up and down step sizes are determined by $$p_f = \frac{\delta_{dn}}{\delta_{up}},$$

where $\delta_{dn}$ corresponds to the down step size, $\delta_{up}$ corresponds to the up step size and $p_f$ corresponds to an average decoding error probability for a reporting period f.

11. The method according to claim 10, wherein the link quality measure corresponds to an average SINR for the link quality reporting period.

12. The method according to claim 10, wherein the link quality reporting period corresponds to a predetermined number of frames.

13. The method according to claim 10, wherein the decoding error signal has a first value corresponding to a number of decoding errors greater than a predetermined threshold.

14. The method according to claim 13, wherein the decoding error corresponds to a flame error indicator.

* * * * *